J. J. SMITH.
STONE SAWING MACHINE.
APPLICATION FILED SEPT. 6, 1910.
985,465.
Patented Feb. 28, 1911.
2 SHEETS—SHEET 2.
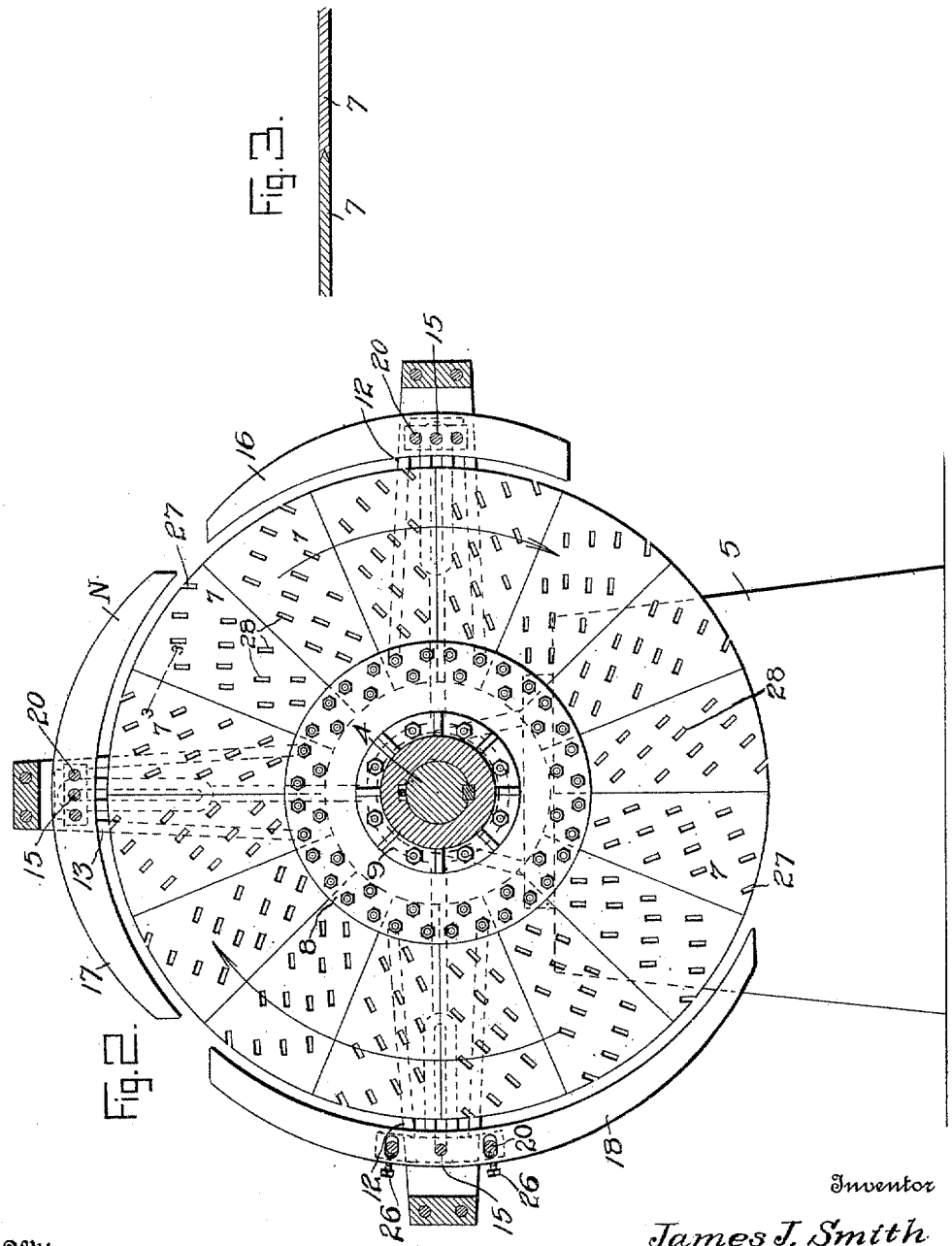
Witnesses
C. K. Reichenbach.
E. B. Watts.
Inventor
James J. Smith
By Delbert H. Decker
Attorney

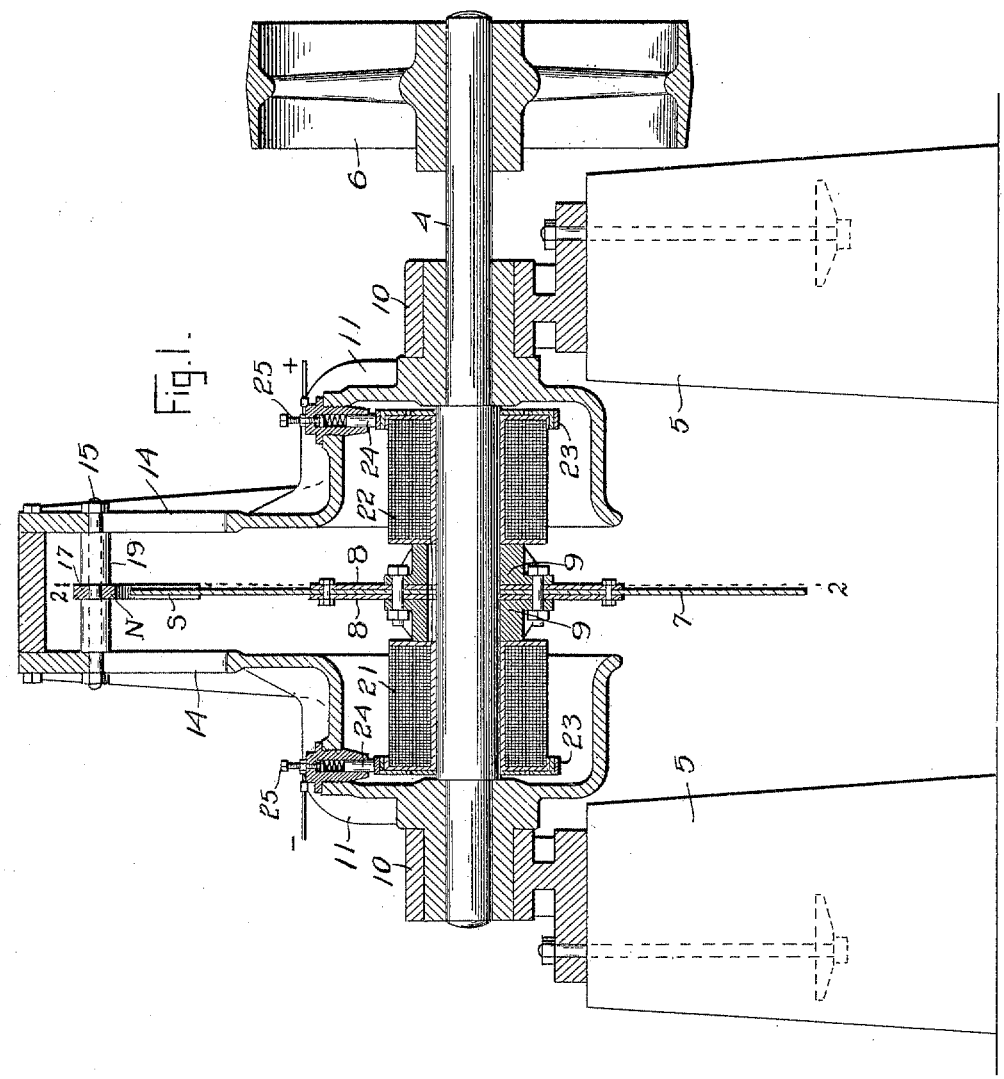

UNITED STATES PATENT OFFICE.

JAMES J. SMITH, OF NEW YORK, N. Y.

STONE-SAWING MACHINE.

985,465. Specification of Letters Patent. Patented Feb. 28, 1911.

Application filed September 6, 1910. Serial No. 580,626.

*To all whom it may concern:*

Be it known that I, JAMES J. SMITH, a citizen of the United States, residing at New York, in the county of New York and State of New York, have invented certain new and useful Improvements in Stone-Sawing Machines, of which the following is a specification.

This invention relates to the art of sawing stone and particularly to the employment of magnetism for holding metallic shot to the cutting edge of a saw blade.

The chief object of the invention is to provide a stone cutting saw that shall be capable of cutting more rapidly and smoothly than saws now in use and with less waste of material.

Another object of the invention, and one through the instrumentality of which the chief object is achieved, is the production of a magnetic field in the cutting blade in a manner such that metallic shot will be held to the edge of the blade for cutting purposes.

A further object of the invention is the construction of a rotary stone cutting saw capable of magnetization in a manner such that the metallic shot used in stone cutting will be readily picked up and held to the periphery of the saw.

To the fulfilment of these objects the invention consists in the application of magnetism to a stone cutting saw in a manner such as to hold metallic shot or like cutting particles to the cutting edge of the saw and in the structure, formation and combination of parts for the purpose specified, substantially as hereinafter set forth and claimed.

In the accompanying drawings which form a part of this specification Figure 1 represents in vertical axial section one form of stone cutting saw embodying this invention; Fig. 2 represents a vertical transverse section taken on the line 2—2 of Fig. 1; and Fig. 3 represents a transverse tangential section through one of the joints between plates constituting the blade of the saw taken, for instance, as indicated by the line 3—3 in Fig. 2.

The invention is shown as embodied in a rotary stone cutting saw, such as by trial has proven of high efficiency. Not only does the magnetic attraction pick up and hold the metallic abrasive to the edge of the saw, but it likewise prevents such abrasive from flying from the saw in response to the centrifugal force when the saw is run at a high speed. Herein also lies another advantage gained by magnetizing the saw. As the highest degree of attraction occurs at the periphery and the greatest centrifugal force is there exerted also, the two combine to hold the abrasive material on the cutting edge thereby leaving the sides of the blade practically free. Thus a narrow kerf is produced and the rapidity of the cut increased. The saw blade, as is usually the case, is not as hard as the abrasive particles or shot and therefore such particles are to some extent embedded in the saw blade as they are carried by it through the kerf in the stone. The abrasive used may be the usual steel or iron shot now in use or it may consist of any other magnetizable material suitable for the purpose.

The machine illustrated in the drawings has an axis or arbor as 4 mounted firmly upon abutments 5 in suitable journal bearings and is provided with a driving-pulley 6. Upon this arbor the saw is mounted and preferably consists of a number of sector-like plates 7, which are bolted between collars 8, which in turn are bolted between the members 9 of the hub. The plates 7 are preferably fitted together by a V-joint as indicated in Fig. 3.

The saw may be magnetized in any suitable manner so long as the periphery thereof has the attractive force to a higher degree than any other part of the saw. One manner in which this result may be obtained is illustrated wherein upon the arbor 4 there is mounted, within the pillow-blocks 10, at either side of the saw blade, cup-shaped shields 11, having horizontally radiating arms 12 and vertically radiating arms 13. These arms are bolted together at their extreme ends and are slotted as at 14. In said slots are located bolts 15, each of which carries at its middle a pole-piece indicated in the drawings by 16, 17 and 18. These pole-pieces are held in place on the bolts 15 by means of distance-pieces 19 and pins 20 which like dowels project from the distance-pieces through holes in the pole-pieces. The said pole-pieces, as seen in Fig. 2, are in the form of arcs and, as seen in Fig. 1, said arcs are in the plane of the saw. It is preferable to place the saw in an electro-magnetic field and to that end there is placed upon the arbor 4, at either side of the saw, electro-magnets 21 and 22. The arbor serves as the core of the magnets. These magnets are so wound as to present their south poles to the saw and their north poles to the shields 11. Current may be supplied to these magnets by means of collars 23 secured to the outer ends of the magnets, with which engage spring-pressed brushes 24, the source of current being connected to said brushes through binding-posts 25. In the structure described there is then a magnetic current from the magnets through the shields 11 and pole-pieces 16, 17 and 18 to the periphery of the saw, which is likewise a common pole-piece to the magnets, and through it back to the cores of the magnets. This provides for holding to the periphery of the saw the abrasive material fed thereto, which will cling to the saw until worn out. Therefore it will be necessary to add abrasive material only at long intervals, and because of the magnetic attraction said abrasive material will be held to the edge of the saw which will make it most effective.

As the saw wears down the pole-pieces 16, 17 and 18 are movable individually toward the center of the saw. This obviously causes the middle of said pole-pieces to approach nearer the periphery than the extremities thereof, therefore, to provide for bringing the lower point of the pole-piece 18 into desired proximity to the periphery of the saw. Said pole-piece is made adjustable in its respective distance-piece which, for this purpose, is made wider than the other distance-pieces and the pins 20 are set farther apart. These pins pass through elongated holes in the pole-piece 18 and set screws as 26 enter said holes and take against said pins so that upon the adjustment of said screws the lower end of the pole-piece may be made to approach more or less closely to the periphery of the saw. It is also preferable to keep the pole-piece 18 a little closer to the saw than the other pole-piece, whereby to induce at that point a stronger magnetic field than elsewhere, which aids in picking up the shot and holding them more firmly to the saw in its passage through the stone. Rapid cutting of the saw is also induced by providing the periphery thereof with notches substantially as indicated at 27. These notches may be termed secant notches since their length takes the direction of a secant of the circular blade. This is simply the preferred form of notches since other forms of notches may be used if desired. In the operation of the saw the shot are wedged by the rearward corner of these notches between the blade and the stone being cut and this wedging action effects a more rapid abrasion of the stone. To provide for additional notches in the periphery as the outermost ones are lost by the wearing away of the blade successive convolute rows of secant aperture are formed in the sectors of the blade as indicated at 28. The saw may be magnetized in many other ways and it may also be mounted in various ways aside from that illustrated and still produce the result which forms the object of this invention.

The invention claimed is:—

1. A stone cutting saw blade forming one pole of a magnet in combination with another magnetic pole in proximity to the cutting edge of said blade, said poles being of such nature or signs that the magnetic current will flow from the latter pole to the saw.

2. A stone cutting mechanism consisting of a circular blade mounted on a rotary axis and forming at its cutting edge one pole of a magnetic circuit and a part constituting another pole of said circuit located in sufficiently close proximity to said blade and near its cutting edge to cause said edge to attract and hold metallic shot when the blade is traveling at a high rate of speed.

3. A stone cutting mechanism consisting of a circular blade mounted upon a rotary axis, a magnetic coil about said axis, and a pole-piece extending from the said coil to the vicinity of the periphery of the blade.

4. A stone cutting mechanism consisting of a circular blade mounted upon a rotary axis, a magnetic circuit of which said blade forms one pole, and a pole-piece adjustably located in the plane of said blade beyond the periphery thereof.

5. A stone cutting mechanism consisting of a circular blade mounted upon a rotary axis, a magnetic circuit including said blade as one pole thereof, and a series of arc-shaped pole-pieces in the plane of said blade and individually adjustable toward and from the periphery thereof.

6. A stone cutting mechanism consisting of a circular blade mounted upon a rotary axis, magnetic coils at either side of the blade, pole-pieces extending therefrom and uniting in arc-shaped extensions adjustable in said pole-pieces toward and from the periphery of the blade.

7. In a stone cutting mechanism, the combination with a rotary cutting blade forming one pole of a magnet, of a part forming another magnetic pole in the same magnetic circuit as the blade and adjustably mounted in the plane of the blade in proximity to the cutting edge thereof as and for the purpose set forth.

In testimony whereof I affix my signature in presence of two witnesses.

JAMES J. SMITH.

Witnesses:
G. H. D. FOSTER,
WILLIAM L. BOWMAN.

---

Copies of this patent may be obtained for five cents each, by addressing the "Commissioner of Patents, Washington, D. C."